United States Patent
He et al.

(10) Patent No.: US 7,835,346 B2
(45) Date of Patent: Nov. 16, 2010

(54) METHODS, SYSTEMS, AND COMPUTER PROGRAM PRODUCTS FOR PROVIDING TRANSCODER FREE OPERATION (TRFO) AND INTERWORKING BETWEEN UNLICENSED MOBILE ACCESS (UMA) AND UNIVERSAL MOBILE TELECOMMUNICATIONS SYSTEM (UMTS) CALL LEGS USING A MEDIA GATEWAY

(75) Inventors: Yong He, Plano, TX (US); Weijun Lee, Plano, TX (US); Mansong Shen, Plano, TX (US)

(73) Assignee: Genband US LLC, Plano, TX (US)

( * ) Notice: Subject to any disclaimer, the term of this patent is extended or adjusted under 35 U.S.C. 154(b) by 379 days.

(21) Appl. No.: 11/351,339

(22) Filed: Feb. 9, 2006

(65) Prior Publication Data

US 2007/0165636 A1    Jul. 19, 2007

Related U.S. Application Data

(60) Provisional application No. 60/759,596, filed on Jan. 17, 2006.

(51) Int. Cl.
*H04L 12/66* (2006.01)
*H04W 40/00* (2009.01)

(52) U.S. Cl. .................. 370/352; 370/235; 370/335; 370/395.1; 370/466; 455/72; 455/403; 455/445; 455/452.2; 455/519

(58) Field of Classification Search .......... 370/352, 370/235, 335, 395.1, 466; 455/72, 403, 445, 455/452.2, 519, 560
See application file for complete search history.

(56) References Cited

U.S. PATENT DOCUMENTS 5,375,121 A    12/1994    Nishino et al.

(Continued)

FOREIGN PATENT DOCUMENTS

CN    1504039 A    6/2004

(Continued)

OTHER PUBLICATIONS

R.L. Bunting (Editor), "Transcoder Free Operation", Mar. 18, 2004; Version 1.0, 3rd Generation Partnership Project 2.*
Notification of Transmittal of the International Search Report and the Written Opinion of the International Searching Authority, or the Declaration for International Application No. PCT/US07/00942 (Oct. 12, 2007).

(Continued)

*Primary Examiner*—Aung S Moe
*Assistant Examiner*—Benjamin Elliott
(74) *Attorney, Agent, or Firm*—Jenkins, Wilson, Taylor & Hunt, P.A.

(57) ABSTRACT

Methods, systems, and computer program products for establishing transcoding free connections between UMA and UMTS call legs are disclosed. According to one method, a media gateway determines whether codec configurations used by UMA and UMTS legs of a call are compatible. In response to determining that the configurations are compatible, media gateway determines whether rate control is necessary to establish a transcoding free connection. In response to determining that rate control is necessary, the media gateway issues rate control requests on the UMA and UMTS legs as appropriate. The media gateway determines whether the rate control requests are successful. In response to determining that the requests are successful, the media gateway establishes a transcoding free connection between the UMA and the UMTS legs of the call.

13 Claims, 13 Drawing Sheets

U.S. PATENT DOCUMENTS

| | | | |
|---|---|---|---|
| 5,710,976 A | 1/1998 | Hill et al. | |
| 5,905,873 A | 5/1999 | Hartmann et al. | |
| 5,999,529 A | 12/1999 | Bernstein et al. | |
| 6,026,086 A | 2/2000 | Lancelot et al. | |
| 6,046,999 A | 4/2000 | Miki et al. | |
| 6,147,988 A | 11/2000 | Bartholomew et al. | |
| 6,339,594 B1 | 1/2002 | Civanlar et al. | |
| 6,389,016 B1 | 5/2002 | Sabaa et al. | |
| 6,392,993 B1 | 5/2002 | Hamilton et al. | |
| 6,424,637 B1 * | 7/2002 | Pecen et al. | 370/328 |
| 6,549,945 B1 | 4/2003 | Sinibaldi et al. | |
| 6,614,781 B1 | 9/2003 | Elliott et al. | |
| 6,625,169 B1 | 9/2003 | Tofano | |
| 6,647,428 B1 | 11/2003 | Bannai et al. | |
| 6,671,367 B1 * | 12/2003 | Graf et al. | 379/229 |
| 6,693,996 B2 | 2/2004 | Mansfield | |
| 6,731,627 B1 | 5/2004 | Gupta et al. | |
| 6,731,647 B2 * | 5/2004 | Yao | 370/429 |
| 6,765,931 B1 | 7/2004 | Rabenko et al. | |
| 6,795,437 B1 | 9/2004 | Räsänen et al. | |
| 6,845,089 B1 | 1/2005 | Gu et al. | |
| 6,850,778 B1 | 2/2005 | Honkala et al. | |
| 6,850,883 B1 * | 2/2005 | Kapanen et al. | 704/212 |
| 6,865,220 B2 | 3/2005 | Abrishami | |
| 6,898,208 B1 * | 5/2005 | Sligo et al. | 370/466 |
| 6,967,958 B2 * | 11/2005 | Ono et al. | 370/401 |
| 6,967,972 B1 | 11/2005 | Volftsun et al. | |
| 6,973,024 B1 | 12/2005 | Joseph et al. | |
| 6,983,163 B2 * | 1/2006 | Sato et al. | 455/519 |
| 6,990,340 B2 * | 1/2006 | Tamura et al. | 455/432.2 |
| 7,006,489 B2 | 2/2006 | Li et al. | |
| 7,054,318 B2 | 5/2006 | Eneroth et al. | |
| 7,054,320 B1 | 5/2006 | Lee et al. | |
| 7,058,085 B2 | 6/2006 | Earnshaw et al. | |
| 7,068,623 B1 | 6/2006 | Barany et al. | |
| 7,072,358 B2 * | 7/2006 | Suvanen | 370/465 |
| 7,082,143 B1 | 7/2006 | LeBlanc et al. | |
| 7,089,011 B1 * | 8/2006 | Mangal | 455/445 |
| 7,095,733 B1 * | 8/2006 | Yarlagadda et al. | 370/352 |
| 7,106,701 B2 * | 9/2006 | Stumpert et al. | 370/252 |
| 7,162,024 B2 * | 1/2007 | Wah et al. | 379/229 |
| 7,180,892 B1 | 2/2007 | Tackin | |
| 7,181,209 B2 * | 2/2007 | Tamura | 455/432.1 |
| 7,203,226 B1 * | 4/2007 | Rabipour et al. | 375/222 |
| 7,245,589 B2 | 7/2007 | Neulist et al. | |
| 7,245,931 B2 | 7/2007 | Wang et al. | |
| 7,304,984 B2 | 12/2007 | Butler et al. | |
| 7,305,229 B2 * | 12/2007 | Fox et al. | 455/406 |
| 7,349,698 B2 * | 3/2008 | Gallagher et al. | 455/435.2 |
| 7,369,859 B2 * | 5/2008 | Gallagher | 455/456.1 |
| 7,400,881 B2 * | 7/2008 | Kallio | 455/412.2 |
| 7,471,655 B2 * | 12/2008 | Gallagher et al. | 370/329 |
| 7,593,415 B2 * | 9/2009 | Li et al. | 370/401 |
| 7,729,346 B2 | 6/2010 | Lee et al. | |
| 2001/0036158 A1 | 11/2001 | Hallenstal et al. | |
| 2002/0001302 A1 | 1/2002 | Pickett | |
| 2002/0013147 A1 | 1/2002 | Fauconnier et al. | |
| 2002/0072364 A1 | 6/2002 | Tamura | 455/432 |
| 2002/0106029 A1 | 8/2002 | Bunn et al. | |
| 2003/0032440 A1 * | 2/2003 | Sato et al. | 455/517 |
| 2003/0058822 A1 * | 3/2003 | Jou | 370/335 |
| 2003/0112796 A1 | 6/2003 | Kwan | |
| 2003/0123485 A1 | 7/2003 | Yi et al. | |
| 2003/0133423 A1 * | 7/2003 | LaDue | 370/330 |
| 2003/0134653 A1 | 7/2003 | Sarkkinen et al. | |
| 2003/0135784 A1 | 7/2003 | Yamaguchi et al. | |
| 2003/0210659 A1 * | 11/2003 | Chu et al. | 370/320 |
| 2004/0008652 A1 | 1/2004 | Tanzella et al. | |
| 2004/0037224 A1 | 2/2004 | Choi et al. | |
| 2004/0047364 A1 | 3/2004 | Briggs et al. | |
| 2004/0073424 A1 * | 4/2004 | Geppert et al. | 704/235 |
| 2004/0090989 A1 | 5/2004 | Kobayashi | |
| 2004/0100914 A1 * | 5/2004 | Hellwig et al. | 370/254 |
| 2004/0114588 A1 | 6/2004 | Bhaskaran | |
| 2004/0114922 A1 | 6/2004 | Hardee | |
| 2004/0131025 A1 * | 7/2004 | Dohler et al. | 370/328 |
| 2004/0131051 A1 * | 7/2004 | Rabipour et al. | 370/352 |
| 2004/0196867 A1 | 10/2004 | Ejzak et al. | |
| 2004/0208132 A1 | 10/2004 | Neulist et al. | |
| 2004/0252681 A1 * | 12/2004 | Rabipour et al. | 370/360 |
| 2004/0254786 A1 * | 12/2004 | Kirla et al. | 704/216 |
| 2004/0266426 A1 | 12/2004 | Marsh et al. | |
| 2005/0007973 A1 | 1/2005 | Jang et al. | |
| 2005/0013281 A1 | 1/2005 | Milton et al. | |
| 2005/0027948 A1 | 2/2005 | Marlan et al. | |
| 2005/0073977 A1 | 4/2005 | Vanghi et al. | |
| 2005/0074017 A1 * | 4/2005 | Qian et al. | 370/401 |
| 2005/0099940 A1 | 5/2005 | Ohenoja et al. | |
| 2005/0105512 A1 * | 5/2005 | Myhre et al. | 370/352 |
| 2005/0157823 A1 | 7/2005 | Sudhakar | |
| 2005/0185604 A1 | 8/2005 | Agarwal | |
| 2005/0195829 A1 | 9/2005 | Ward | |
| 2005/0232232 A1 * | 10/2005 | Farber et al. | 370/352 |
| 2005/0265279 A1 * | 12/2005 | Markovic et al. | 370/328 |
| 2005/0267746 A1 * | 12/2005 | Jelinek et al. | 704/226 |
| 2005/0286466 A1 * | 12/2005 | Tagg et al. | 370/329 |
| 2006/0050664 A1 | 3/2006 | Guey | |
| 2006/0062225 A1 * | 3/2006 | Li | 370/396 |
| 2006/0067221 A1 | 3/2006 | Lee et al. | |
| 2006/0092927 A1 | 5/2006 | Li et al. | |
| 2006/0154686 A1 | 7/2006 | Sarkkinen et al. | |
| 2006/0193289 A1 | 8/2006 | Ronneke et al. | |
| 2006/0198347 A1 * | 9/2006 | Hurtta et al. | 370/338 |
| 2006/0229068 A1 * | 10/2006 | Niemela et al. | 455/426.1 |
| 2006/0268845 A1 * | 11/2006 | He et al. | 370/352 |
| 2006/0286981 A1 * | 12/2006 | Suumaki et al. | 455/435.1 |
| 2006/0291454 A1 * | 12/2006 | Ali | 370/352 |
| 2006/0291483 A1 * | 12/2006 | Sela | 370/401 |
| 2007/0011727 A1 * | 1/2007 | Mielenz et al. | 726/6 |
| 2007/0041320 A1 * | 2/2007 | Chen et al. | 370/235 |
| 2007/0041360 A1 * | 2/2007 | Gallagher et al. | 370/352 |
| 2007/0043558 A1 * | 2/2007 | Schwarz et al. | 704/207 |
| 2007/0123196 A1 * | 5/2007 | Tamura | 455/403 |
| 2007/0127357 A1 | 6/2007 | Tamura | |
| 2007/0127436 A1 | 6/2007 | Karimi-Cherkandi et al. | |
| 2007/0135165 A1 * | 6/2007 | Junghanns et al. | 455/560 |
| 2007/0140214 A1 | 6/2007 | Zoltan | |
| 2007/0140293 A1 * | 6/2007 | Agarwal et al. | 370/466 |
| 2007/0165636 A1 * | 7/2007 | He et al. | 370/391 |
| 2007/0171841 A1 * | 7/2007 | Witzel et al. | 370/254 |
| 2007/0186002 A1 | 8/2007 | Campbell et al. | |
| 2007/0286082 A1 * | 12/2007 | Hikspoors et al. | 370/238 |
| 2008/0039087 A1 * | 2/2008 | Gallagher et al. | 455/435.2 |
| 2008/0102794 A1 * | 5/2008 | Keevill et al. | 455/411 |
| 2008/0123596 A1 * | 5/2008 | Gallagher et al. | 370/331 |
| 2008/0151845 A1 * | 6/2008 | Jaakkola et al. | 370/338 |
| 2008/0225765 A1 | 9/2008 | Marinier et al. | |
| 2008/0293416 A1 | 11/2008 | Yi et al. | |
| 2008/0316980 A1 | 12/2008 | Ahlen et al. | |

FOREIGN PATENT DOCUMENTS

| | | | |
|---|---|---|---|
| CN | 101341730 A | 1/2009 | |
| CN | 02808634.1 | 4/2009 | |
| EP | 1 017 217 A2 | 7/2000 | |
| EP | 1 364 499 B1 | 7/2009 | |
| GB | 2363295 | 12/2001 | |
| GB | 2389486 A * | 12/2003 | |
| WO | WO 99/29136 | 6/1999 | |
| WO | WO 99/40569 | 8/1999 | |
| WO | WO 02/069588 A2 | 9/2002 | |
| WO | WO 02/069588 A3 | 9/2002 | |
| WO | WO 03/043299 A1 | 5/2003 | |
| WO | WO 03103313 A1 * | 12/2003 | |

| | | |
|---|---|---|
| WO | WO 2005/050960 A1 | 6/2005 |
| WO | WO 2007/022461 A2 | 2/2007 |
| WO | WO 2007/084417 A2 | 7/2007 |

OTHER PUBLICATIONS

Commonly-assigned, co-pending U.S. Appl. No. 11/207,572 for "Methods, Systems, and Computer Program Products for Supporting Transcoder-Free Operation in Media Gateway," (Unpublished, filed Aug. 19, 2005).

"Third Generation Partnership Project; Technical Specification Group Core Network and Terminals; Interworking Between the IP Multimedia (IM) Core Network (CN) Subsystem and Circuit Switched (CS) Networks (Release 6)" 3GPP TS 29.163, pp. 1-128 (Jun. 2005).

Agilent Technologies, "UMTS Network and Service Assurance," International Engineering Consortium, http://www.iec.org/online/tutorials/agilent_umts_network/topic03.html, pp. 1-4 (Copyright 2005).

"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications, ETSI TS 126 202, pp. 1-14 (Dec. 2004).

Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, http://www.apps.ietf.org/rfc/rfc3267.html, pp. 1-48 (Jun. 2002).

"Third Generation Partnership Project," Meeting Report v3.0.0, 3GPP TSG-TrFO Workshop#04, pp. 1-18 (Oct. 17-19, 2000).

Official Action for U.S. Appl. No. 11/207,572 (Oct. 6, 2008).

Notification of Transmittal of the International Search Report and the Written Opinion of the International Searching Authority, or the Declaration for the International Application No. PCT/US06/32484 (May 7, 2007).

Interview Summary for U.S. Appl. No. 11/207,572 (Oct. 16, 2006).

Interview Summary for U.S. Appl. No. 11/121,626 (Oct. 15, 2009).

Commonly-assigned, co-pending U.S. Appl. No. 12/535,655 for "Methods, Systems, and Computer Readable Media for Intelligent Optimization of Digital Signal Processor (DSP) Resource Utilization in a Media Gateway", (Unpublished, filed Aug. 4, 2009).

Final Official Action for U.S. Appl. No. 11/207,572 (May 28, 2009).

Office Action for U.S. Appl. No. 11/121,626 (May 15, 2009).

Notice of Allowance and Fee(s) Due for U.S. Appl. No. 11/297,941 (May 15, 2009).

Final Official Action for U.S. Appl. No. 11/230,029 (May 14, 2009).

Final Official Action for U.S. Appl. No. 11/297,941 (Jan. 22, 2009).

Communication under Rule 71(3) EPC for European Patent Application No. 02 709 657.7 (Jan. 9, 2009).

Notice of Grant of Patent Right for Invention for Chinese Patent Application No. 02808634.1 (Dec. 26, 2008).

Final Official Action for U.S. Appl. No. 11/121,626 (Nov. 13, 2008).

Official Action for U.S. Appl. No. 11/230,029 (Oct. 29, 2008).

Official Action for Chinese Patent Application No. 02808634.1 (Jun. 20, 2008).

Official Action for U.S. Appl. No. 11/297,941 (May 1, 2008).

Communication pursuant to Rules 161 and 162 EPC for European application No. 06813571.4 (Mar. 28, 2008).

Office Action for U.S. Appl. No. 11/121,626 (Feb. 20, 2008).

International Search Report for International Application No. PCT/US2006/028549 (Dec. 11, 2006).

Communication pursuant to Article 96(2) EPC for European Application No. 02709657 (Jan. 23, 2006).

Notice of Allowance and Fee(s) Due for U.S. Appl. No. 09/792,265 (Sep. 16, 2005).

Final Official Action for U.S. Appl. No. 09/792,265 (Jun. 15, 2005).

Official Action for U.S. Appl. No. 09/792,265 (Oct. 4, 2004).

Notification of Transmittal of International Preliminary Examination Report for International Application No. PCT/US02/05410 (Dec. 5, 2003).

Written Opinion for International Application No. PCT/US02/05410 (Jun. 13, 2003).

Notification of Transmittal of the International Search Report of the Declaration for PCT/US02/05410 (Dec. 27, 2002).

Laurence, M. et al., "Voice Over ATM: A Hybrid TDM/ATM Design Approach," electronic Engineering, Morgan-Grampian Ltd., vol. 71, No. 869, Jun. 1999, pp. 81-82, 84, and 86.

Singer, Josef et al., "Narrow band Services Over ATM Networks: Evaluation of Trunking Methods," World Telecommunications Congress, vol. 2, Sep. 21, 1997, pp. 17-25.

Notice of Allowance and Fee(s) Due for U.S. Appl. No. 11/121,626 (May 27, 2010).

Interview Summary for U.S. Appl. No. 11/121,626 (May 21, 2010).

Notice of Allowance and Fee(s) Due for U.S. Appl. No. 11/207,572 (May 3, 2010).

Notice of Allowance and Fee(s) Due for U.S. Appl. No. 11/207,572 (Jan. 26, 2010).

Final Official Action for U.S. Appl. No. 11/121,626 (Jan. 12, 2010).

Notice of Allowance and Fee(s) Due for U.S. Appl. No. 11/230,029 (Jan. 12, 2010).

Notice of Allowance and Fee(s) Due for U.S. Appl. No. 11/121,626 (Jun. 24, 2010).

* cited by examiner

METHODS, SYSTEMS, AND COMPUTER PROGRAM PRODUCTS FOR PROVIDING TRANSCODER FREE OPERATION (TRFO) AND INTERWORKING BETWEEN UNLICENSED MOBILE ACCESS (UMA) AND UNIVERSAL MOBILE TELECOMMUNICATIONS SYSTEM (UMTS) CALL LEGS USING A MEDIA GATEWAY

RELATED APPLICATIONS

This application claims the benefit of a U.S. provisional patent application No. 60/759,596 entitled, "Methods, Systems, and Computer Program Products for Providing Transcoder Free Operation (TrFO) and Interworking Between Unlicensed Mobile Access (UMA) and Universal Mobile Telecommunications System (UMTS) Call Legs Using A Media Gateway", filed Jan. 17, 2006; the disclosure of which is incorporated herein by reference in its entirety.

TECHNICAL FIELD

The subject matter described herein relates to providing transcoder free operation and interworking between UMA and UMTS call legs. More particularly, the subject matter described herein relates to methods, systems, and computer program products for providing transcoder free operation and interworking between UMA and UMTS call legs using a media gateway.

BACKGROUND ART

In voice communications networks, such as voice over IP networks, transcoding refers to converting from one type of voice compression to another. Transcoding is necessary when different legs of a call have incompatible coder/decoders (codecs); however, when the different legs of a call use compatible codecs, it is desirable to establish a transcoding free connection. Establishing a transcoding free connection is desirable because transcoding introduces delay and degrades voice quality. The terms "transcoder free" and "transcoding free" are used interchangeably herein to refer to the absence of transcoding in a connection.

It may be desirable to establish a transcoder free connection when both legs of a call are UMTS. It may also be desirable to establish a transcoder free connection when at least one leg of a call is not UMTS. For example, it may be desirable to establish a transcoder free connection between a UMA call leg and a UMTS call leg. Third Generation Partnership Project (3GPP) Technical Standard TS 29.163 requires transcoder free operation when an IP multimedia media gateway (IM-MGW) is used to bridge a connection between an Nb and an Mb interface. An Mb interface is an interface between the media gateway and an access point in the UMA network. An Nb interface is an interface between the media gateway and another media gateway in the UMTS network.

Although the above-referenced 3GPP standard indicates that transcoder free operation should be implemented by an IM-MGW, the technical standard fails to describe any hardware or software necessary to achieve such operation. Moreover, the technical standard omits many of the details required for transcoder free operation. For example, the technical standard fails to address timing issues with regard to rate control, redundancy reconciliation between the UMA and UMTS networks, and differences in packetization timing between the UMA and UMTS networks.

Accordingly, in light of these difficulties, there exists a need for methods, systems, and computer program products for providing transcoder free operation and interworking between UMA and UMTS call legs using a media gateway.

DISCLOSURE OF THE INVENTION

According to one aspect, the subject matter described herein includes a method for establishing a transcoding free connection between a UMA call leg and a UMTS call leg. The method includes determining whether UMA and UMTS call legs have compatible codecs. In response to determining that the UMA and UMTS call legs have compatible codecs, it is determined whether rate control is needed to establish a transcoding free connection. If it is determined that rate control is needed, at least one rate control request is issued from a media gateway to at least one of the UMA and UMTS call legs. Media streams from the UMA and UMTS call legs are monitored to determine whether the rate control is successful. In response to determining that the rate control is successful, a transcoding free connection is established in the media gateway between the UMA and UMTS call legs.

The terms "call," "session," and "connection" are used interchangeably herein to refer to a path over which media communications are exchanged between UMA and UMTS nodes. Thus, a call, session, or connection that involves UMA and UMTS nodes may carry voice, video, non-voice audio, or any media communication between the nodes.

The subject matter described herein for providing transcoder free operation and interworking between UMA and UMTS call legs using a media gateway may be implemented using hardware, software, firmware, or any combination thereof. In one implementation, the subject matter described herein can be implemented using a computer program product comprising computer executable instructions embodied in a computer readable medium. Exemplary computer readable media suitable for implementing the subject matter described herein include chip memory devices, disk memory devices, programmable logic devices, and application specific integrated circuits. In addition, a computer program product that implements the subject matter described herein can be located on a single computing device or platform or may be distributed across multiple computing devices or platforms.

BRIEF DESCRIPTION OF THE DRAWINGS

Preferred embodiments of the subject matter described herein will now be explained with reference to the accompanying drawings.

DETAILED DESCRIPTION OF THE INVENTION

Figure 1:
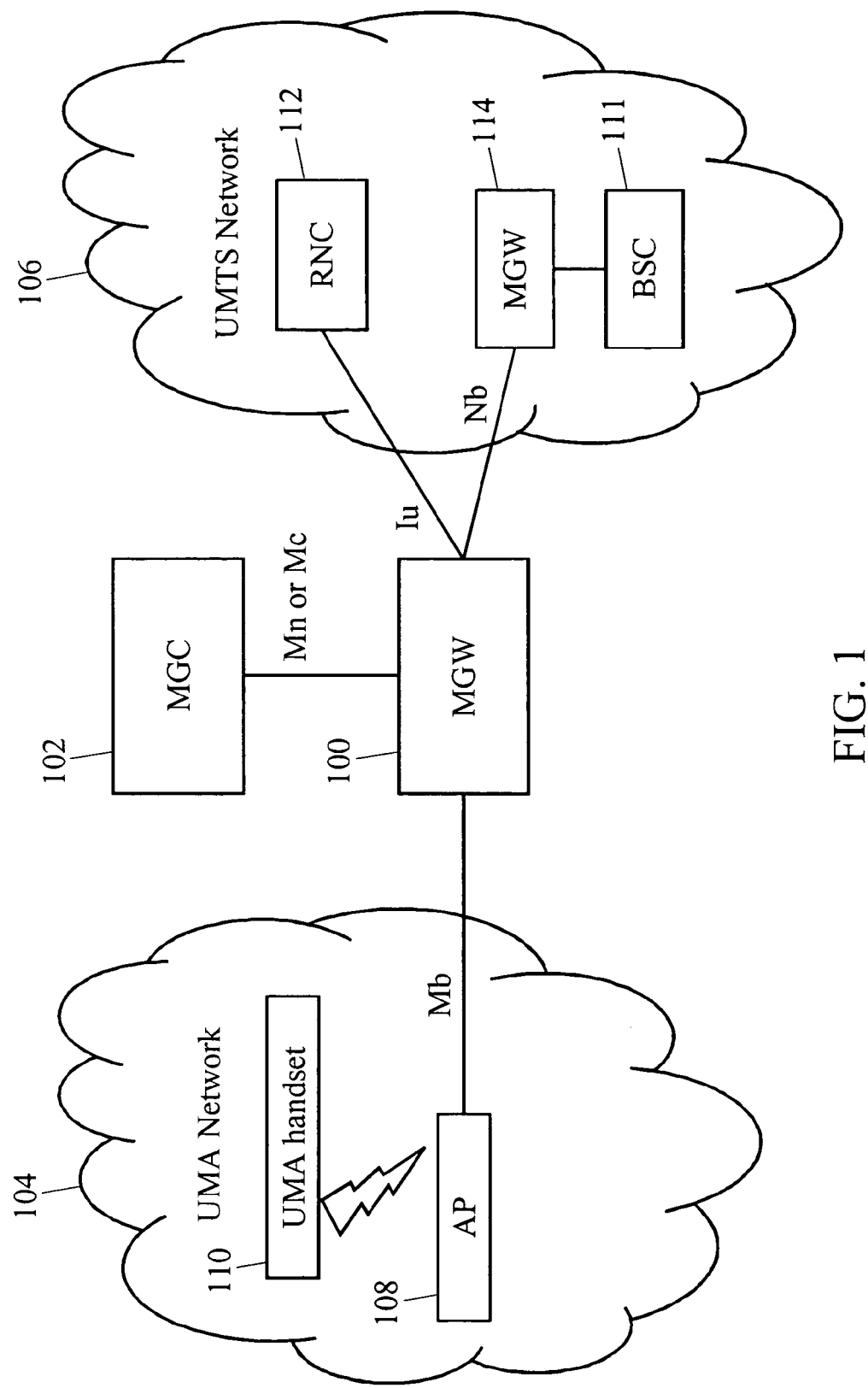
FIG. 1 is a network diagram illustrating a media gateway for providing interworking and transcoder free operation between a UMA network and a UMTS network according to an embodiment of the subject matter described herein.

FIG. 1 is a block diagram illustrating a network including a media gateway for establishing a transcoder free connection between a UMA call leg and a UMTS call leg according to an embodiment of the subject matter described herein. Referring to FIG. 1, a media gateway 100 and a media gateway controller 102 are positioned between UMA network 104 and UMTS network 106. Media gateway 100 interfaces with an access point (AP) 108 in the UMA network via the Mb interface. A UMA handset 110 may connect to media gateway 100 via access point 108.

Media gateway 100 interfaces with media gateway controller 102 via an Mn or Mc interface. Media gateway 100 and media gateway 102 exchange control and state information via the Mn or Mc interface. For example, media gateway controller 102 may issue MEGACO or MGCP call control commands to media gateway 100 via the Mn or Mc interface to control session setup, tear down, and maintenance.

Media gateway 100 interfaces with UMTS network 106 via an Iu interface and an Nb interface. More particularly, media gateway 100 connects to a radio network controller (RNC) 112 via the Iu interface. Radio network controller 112 may control one or more base stations that allow a UMTS handset to initiate and terminate calls using media gateway 100. Media gateway 100 connects with media gateway 114 via an Nb interface. Media gateway 114 may connect with one or more base station controllers 116 that allow UMTS handsets to connect to the network via an air interface.

In the network illustrated in FIG. 1, it may be desirable to establish calls between UMA network 104 and UMTS network 106. That is, a call may have a UMA leg that connects to UMA network 104 and a UMTS leg that connects to UMTS network 106. If the codecs used by the different legs of the call are compatible, it may be desirable to establish a transcoder free connection using media gateway 100 in order to avoid packetization delay and to improve voice quality.

Figure 2:
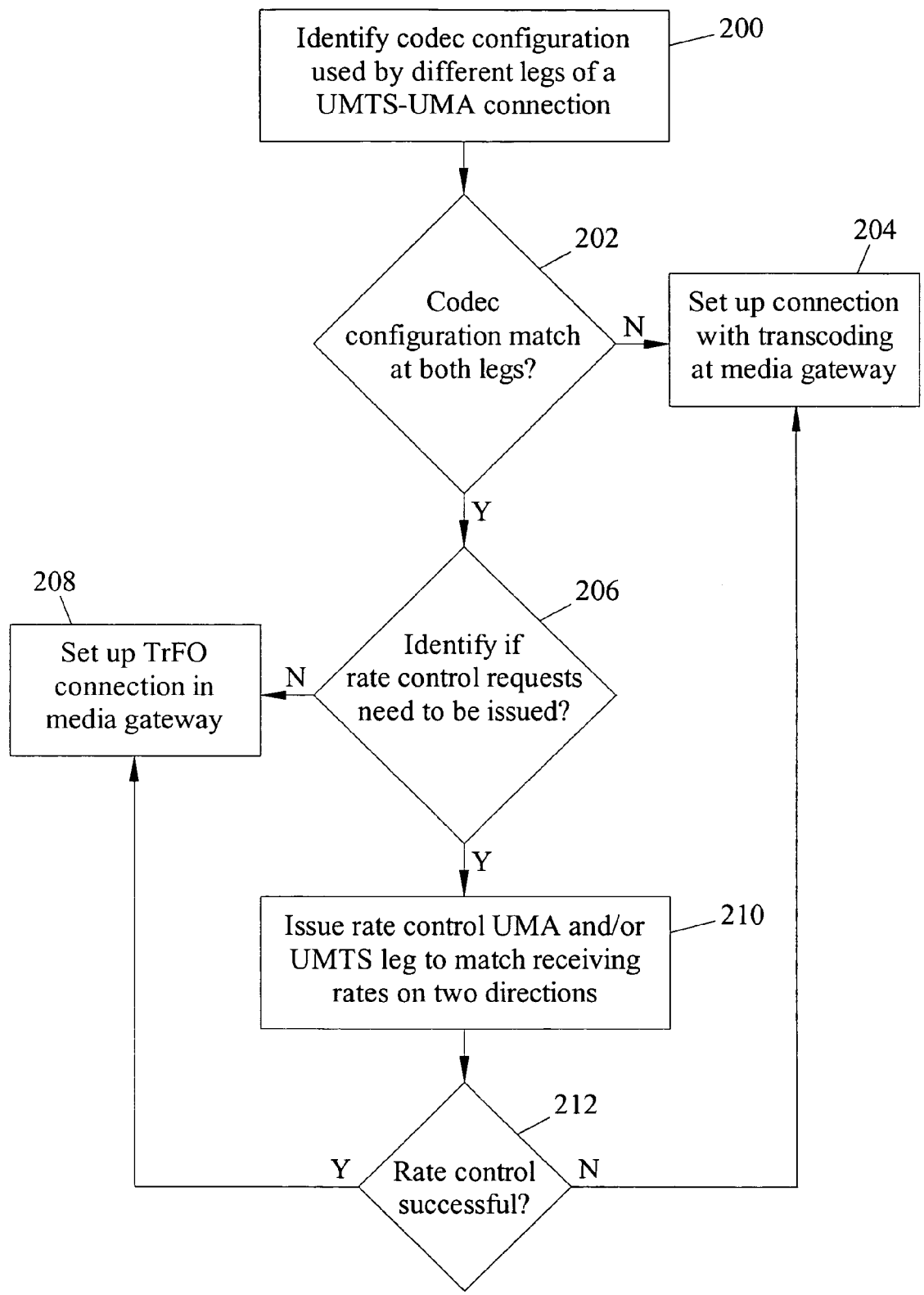
FIG. 2 is a flow chart illustrating exemplary steps for establishing a transcoder free connection between a UMA call leg and a UMTS call leg using a media gateway according to an embodiment of the subject matter described herein.

FIG. 2 is a flow chart illustrating exemplary steps that may be used to establish a transcoding free connection between a UMA call leg and a UMTS call leg using media gateway 100 according to an embodiment of the subject matter described herein. Referring to FIG. 2, in step 200, media gateway 100 identifies a codec configuration used by different legs of a UMTS-UMA connection. This step may be performed by analyzing call setup signaling messages used to initially establish the UMTS-UMA connection. For example, if call setup is performed using session initiation protocol (SIP), the initial codec used by each endpoint of a connection may be specified in the session description protocol (SDP) portion of each SIP call setup message.

In step 202, media gateway 100 determines whether the codec configurations of the call legs match. For example, this step may include determining whether both ends of the connection use the same type of codec, such as an adaptive modulation rate (AMR) codec. If it is determined that the codec configurations do not match, control proceeds to step 204 where the connection is set up with transcoding at the media gateway.

In step 202, if it is determined that the codec configurations match, control proceeds to step 206 where media gateway 100 identifies whether rate control needs to be issued. Rate control is required to be issued for compatible codecs if the encoding rate being transmitted by one side to the other side does not match the decoding rate being used by the receiving side. If the rates are the same, rate control does not need to be issued and control proceeds to step 208 where a transcoding free connection is set up in the media gateway. An exemplary media gateway architecture for establishing a transcoding free connection will be described in detail below.

In step 206, if it is determined that rate control requests need to be issued, control proceeds to step 210 where media gateway 100 issues rate control requests on the UMA and/or UMTS legs so that the rate sent by the UMA leg to the UMTS leg matches the receiving rate of the UMTS leg and so that the rate sent by the UMTS leg to the UMA leg matches the receiving rate of the UMA leg. In step 212, media gateway 100 determines whether the rate control is successful. If rate control is not successful, control proceeds to step 204 where the connection in the media gateway is set up with transcoding. If the rate control is successful, control proceeds to step 208 where a transcoding free connection is set up in the media gateway.

Figure 3:
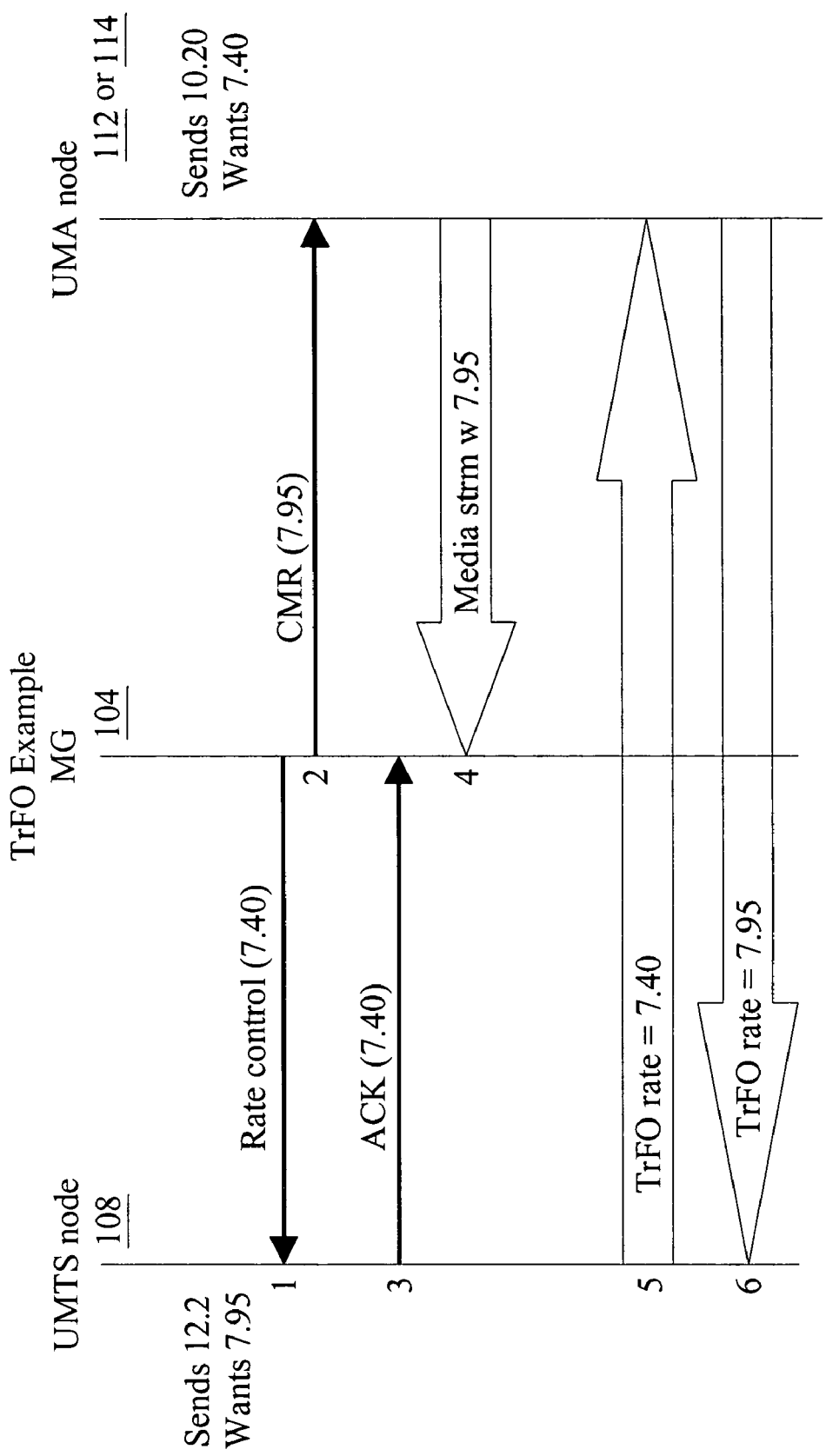
FIG. 3 is a message flow diagram illustrating exemplary rate control requests that may be issued by a media gateway to establish a transcoder free connection between a UMA call leg and a UMTS call leg according to an embodiment of the subject matter described herein.

FIG. 3 is a message flow diagram illustrating exemplary steps that may be performed by media gateway 100 in issuing appropriate rate control as illustrated by step 210 in FIG. 2. Referring to FIG. 3, it is assumed that UMTS node 108 sends packetized voice information encoded at 12.2 kilobits per second and wants to receive packetized voice encoded at 7.95 kilobits per second. It is also assumed that UMA node 112 or 114 sends packetized voice information encoded at 10.2 kilobits per second and wants to receive packetized voice information encoded at 7.4 kilobits per second. Accordingly, in line 1 of the message flow diagram, media gateway 100 issues a rate control message to UMTS node 108 requesting that UMTS node 108 change its sending codec rate to 7.4 kilobits per second. In line 2 of the message flow diagram, MG 100 issues a codec mode request (CMR) to the UMA node requesting that the UMA node 112 or 114 change its sending codec rate to 7.95 kilobits per second. In line 3 of the message flow diagram, UMTS node 108 sends an acknowledgement message to media gateway 100 acknowledging that the sending codec rate has been changed to 7.4 kilobits per second. Media gateway 100 detects this fact and determines that rate control was successful on the UMTS side. Similarly, in line 3 of the message flow diagram, media gateway 100 detects packetized voice from UMA node 112 or 114 with a media stream encoded at 7.95 kilobits per second. After line 4, media gateway 100 determines that the rate change was successful on the UMA side.

Accordingly, after line 4, media gateway 100 can establish a transcoding free connection between UMTS node 108 and UMA node 112 or 114. In line 5 of the message flow diagram, UMTS node 108 sends packetized voice information to UMA node 112 or 114 via the transcoder free connection in media gateway 100. Similarly, in line 6 of the message flow diagram, UMA node 112 or 114 sends packetized voice information to UMTS node 108.

Figure 4:
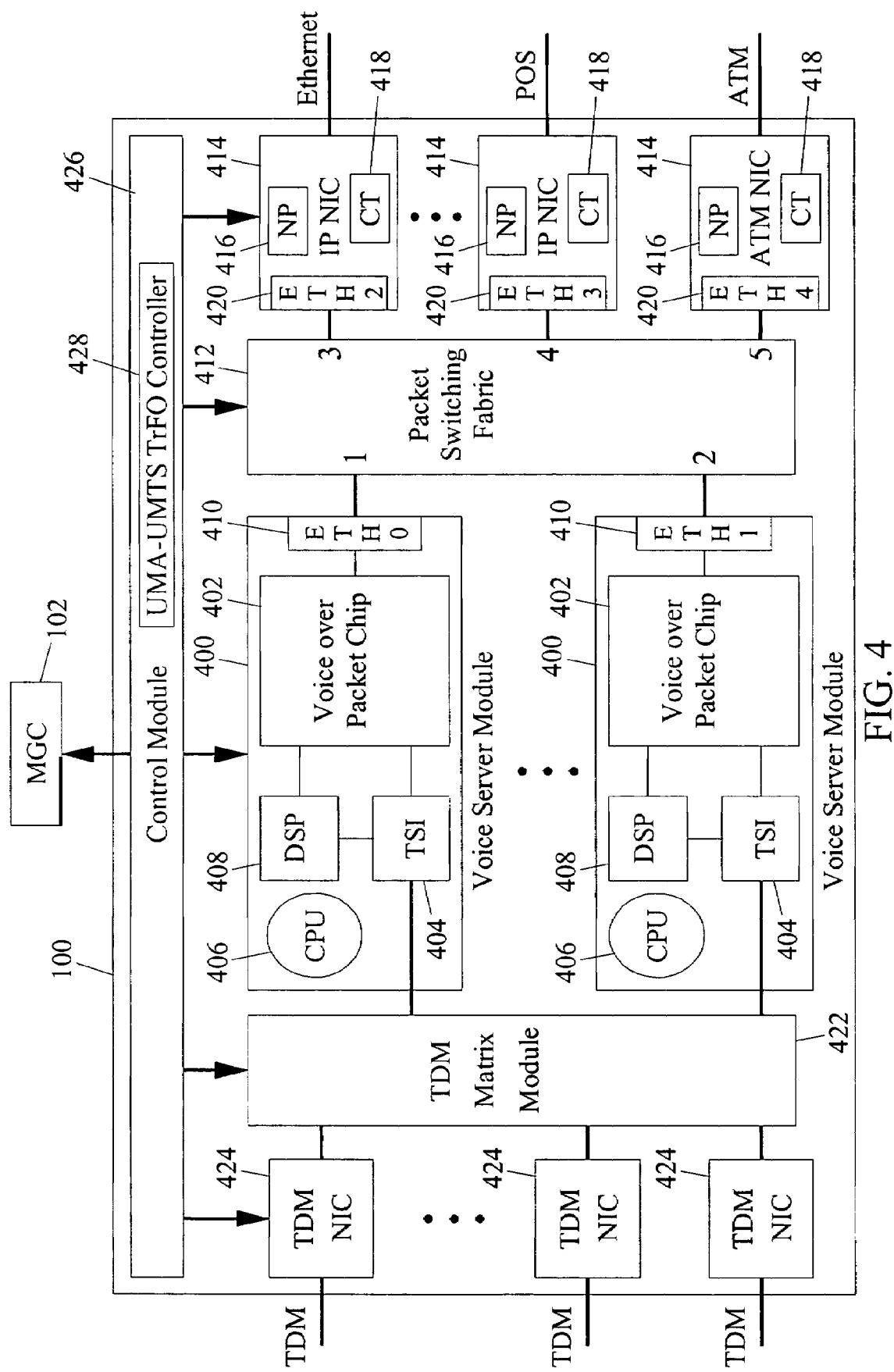
FIG. 4 is a block diagram illustrating an exemplary internal architecture of a media gateway for establishing a transcoder free connection and for providing interworking between user plane protocols of UMA and UMTS call legs according to an embodiment of the subject matter described herein.

FIG. 4 is a block diagram illustrating an exemplary internal architecture for media gateway 100 according to an embodiment of the subject matter described herein. Referring to FIG. 4, media gateway 100 includes a plurality of voice servers 400 for performing voice processing functions. In the illustrated example, each voice server module 400 includes a voice over packet chip 402, a time slot interconnection (TSI) 404, a CPU 406, and a digital signal processor (DSP) 408. Voice over packet chip 402 of each voice server module 400 includes voice over packet assembly and disassembly capabilities. For example, each voice over packet chip may implement real time transmission protocol (RTP), ATM adaptation layer 1, and ATM adaptation layer 2 for sending and receiving voice packets over IP or ATM networks. TSI 404 makes on demand connections between voice over IP chip channels, TDM matrix channels, and DSPs 408. Each DSP 408 performs transcoding, echo cancellation, and other payload translation functions. Each DSP 408 may implement IuUp and NbUp protocol stacks for interfacing with UMTS nodes. CPU 406 controls the overall operation of each voice server module 400. Ethernet interfaces 410 connect each voice server module 400 to a packet switching fabric 412. Packet switching fabric 412 may be any suitable type of switching fabric for switching packets between voice server module 400 and Ethernet interfaces 410. Examples of switching fabrics suitable for use with embodiments with the subject matter described herein include ATM switching fabrics and Ethernet switching fabrics. In the examples described below, it will be assumed that packet switching fabric 412 comprises an Ethernet switching fabric.

Media gateway 100 also includes broadband network interfaces 414 for connecting media gateway 100 to external networks for receiving packets from the network. Broadband network interfaces 414 may include IP network interfaces as well as ATM network interfaces. Each broadband network interface 414 may include a network processor 416, a connection table 418, and an Ethernet interface 420. Network processors 416 may control the writing of data to each connection table 418. Each connection table 418 maintains connection data for forwarding media packets to the correct voice server. Internal Ethernet interfaces 420 connect each broadband network interface 414 to packet switching fabric 412.

Packet switching fabric 412 interconnects voice servers 400 and broadband network interfaces 414. In the illustrated example, packet switching fabric 412 includes a plurality of ports, numbered 1-5. Five ports are shown for illustrative purposes only. It is understood that packet switching fabric 412 may include fewer or more than five ports, depending on the number of devices connected to packet switching fabric 412.

Media gateway 100 also includes a TDM matrix module 422 for switching TDM timeslots between TDM network interfaces 424 and voice servers 400. TDM network interfaces 424 connect media gateway 100 to external TDM devices, such as TDM-enabled switching offices.

A control module 426 controls the overall operation of media gateway 100. In the illustrated example, control module 426 includes a UMA-UMTS TrFO controller 428 for receiving information from CPUs 406 of each voice server module regarding ingress and egress encoding rates being used by media streams of a UMA or a UMTS connection. UMA-UMTS TrFO controller 428 may also receive data from media gateway controller 102 indicating initial rates used by each end of a UMA-UMTS connection. UMA-UMTS TrFO controller 428 may determine, based on the rates, whether TrFO is possible and instruct the CPUs of the appropriate voice servers to issue rate control requests and establish a Transcoding free connection.

Figure 5:
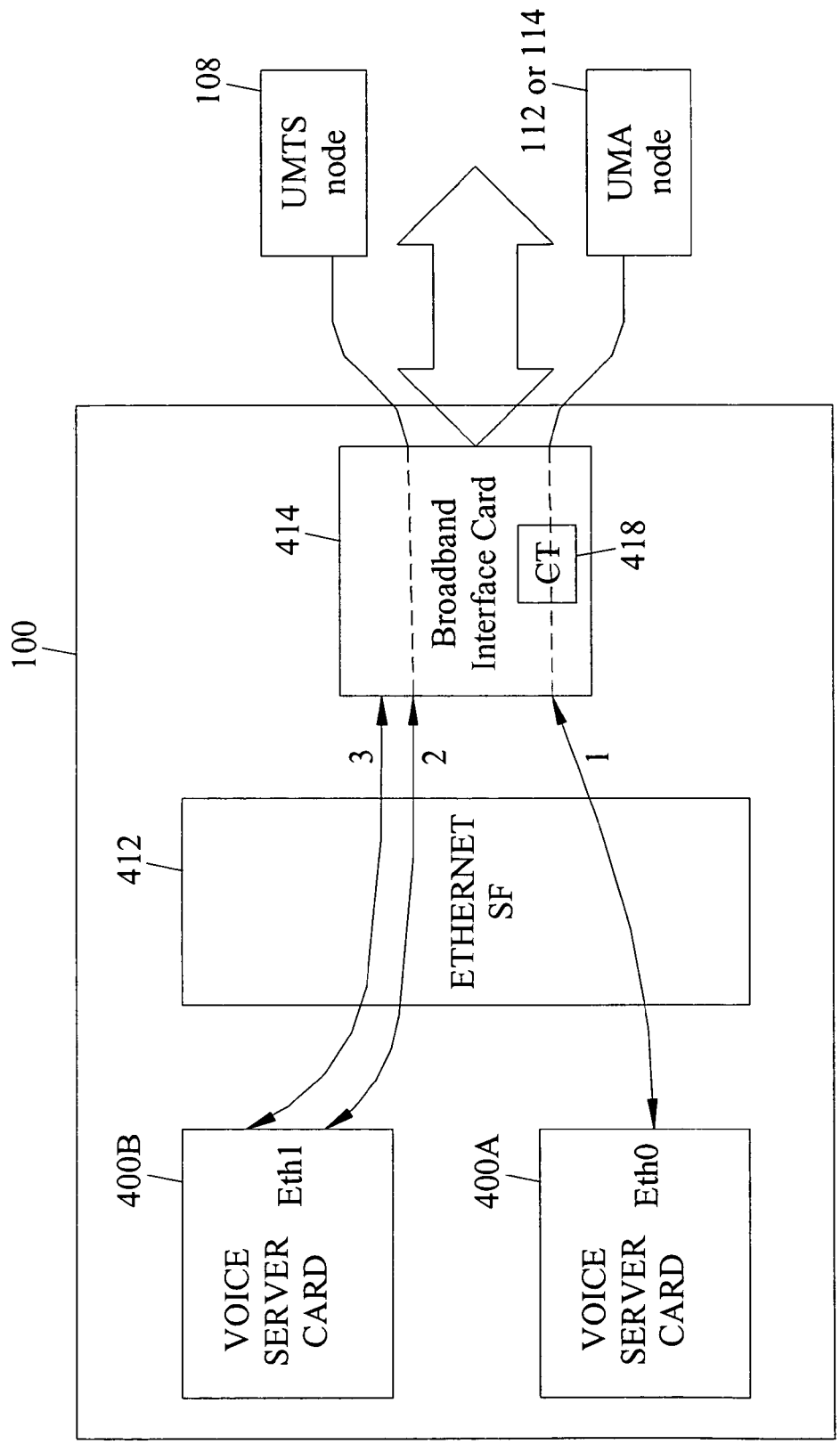
FIG. 5 is a block diagram illustrating exemplary steps that may be performed by a media gateway in establishing an internal transcoder free connection for a call that includes a UMA leg and UMTS leg according to an embodiment of the subject matter described herein.

FIG. 5 is a block diagram illustrating exemplary steps for achieving TrFO for a call that includes a UMA leg and a UMTS leg according to an embodiment of the subject matter described herein. Referring to FIG. 5, a first call leg (labeled 1) is established between UMA node 112 or 114 and voice server card 400A. A second call leg (labeled 2) is established between UMTS node 108 and a second voice server card 400B. A third media connection (labeled 3) is established between broadband interface card 414 and voice server 400B. Once UMA-UMTS TrFO controller 428 determines that transcoder free operation is possible and instructs the voice server cards to issue any needed rate control, UMA-UMTS TrFO controller 428 instructs broadband interface card 414 to replace connection 1 with connection 3. Replacing connection 1 with connection 3 may include instructing broadband interface card 414 to update its connection table 418 to reflect the new voice server for the call.

Setting up the transcoding free connection may include instructing voice server card 400B to implement the appropriate Nb or Iu protocol stack for interfacing with UMTS node 108 over a transcoding-free channel. Tables 1 and 2 shown below illustrate the status of connection table 418 of a broadband network interface card 414 before and after a transcoding free connection is established. Tables 1 and 2 each include a first column indicating the external or network VPI/VCI value associated with incoming ATM cells that carry voice. The second column in each table includes a new VPI/VCI value used internally between the voice server cards and the network interfaces. The third column includes the voice server MAC address corresponding to the connection. It can be seen that in Table 1, before the transcoding free connection is established, the connection to each endpoint includes a separate voice server MAC address. In Table 2, after the transcoding free connection is established, the voice server MAC address to which both endpoints of the connection are connected is Ethernet address Eth0, which corresponds to a single voice server card.

TABLE 1

Broadband Interface Connection Table Before TrFO

| External VPI/VCI | New VPI/VCI | Voice Server MAC Addr. |
|---|---|---|
| 100/1 | 110/1 | Eth 0 |
| 100/2 | 110/2 | Eth 1 |

TABLE 2

Broadband Interface Connection Table After TrFO

| External VPI/VCI | New VPI/VCI | Voice Server MAC Addr. |
|---|---|---|
| 100/1 | 110/3 | Eth 1 |
| 100/2 | 110/2 | Eth 1 |

An important function performed by a DSP once a transcoding free connection is established is radio access bearer sub-flow combination indicator (RFCI) mapping. In order to perform such mapping, the DSP may maintain separate RFCI values for each connection endpoint. Tables 3 and 4 shown below are examples of RFI values that may be maintained by a DSP on a voice server card according to an embodiment of the subject matter described herein.

TABLE 3

RFCI Values and Rates for Endpoint A

| Channel Index | Rate |
|---|---|
| 1 | 12.2k |
| 2 | 10.2k |
| 3 | 7.95k |
| 4 | 6.7k |

TABLE 4

RFCI Values and Rates for Endpoint B

| Channel Index | Rate |
|---|---|
| 5 | 12.2k |
| 6 | 10.2k |
| 7 | 7.95k |
| 8 | 6.7k |

From Tables 3 and 4, the channel index and the corresponding rates for each endpoint can be determined. Once the DSP knows the indices and corresponding rates, the DSP can perform mappings between indices used by different endpoints. In the examples illustrated in Tables 3 and 4, the mappings would be 1-5, 2-6, 3-7, and 4-8.

Figure 6:
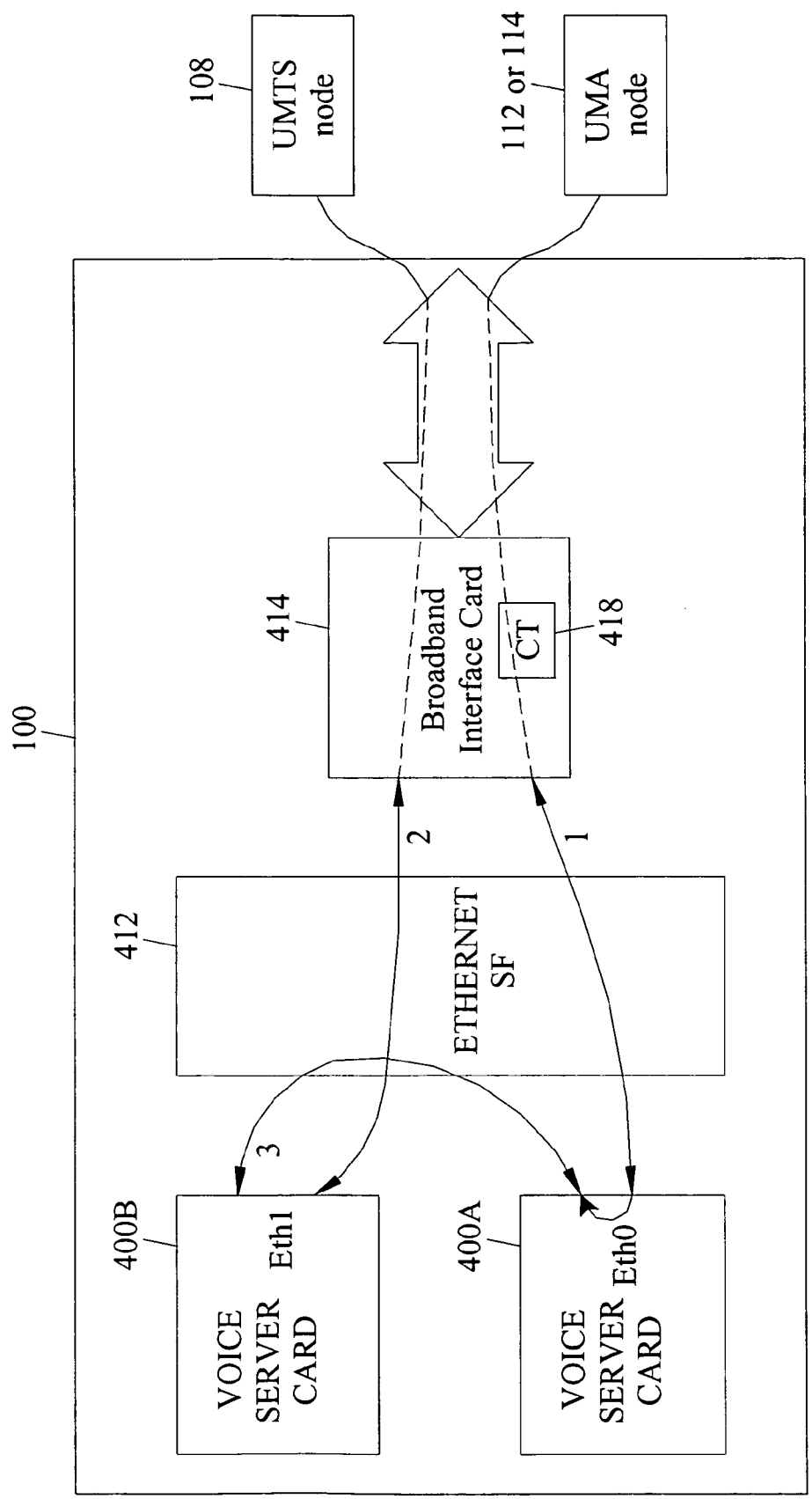
FIG. 6 is a block diagram illustrating an alternate method for establishing a transcoder free connection in a media gateway for a call that has a UMA leg and a UMTS leg according to an embodiment of the subject matter described herein.

FIG. 6 is a block diagram illustrating an alternate method for implementing TrFO for a call having a UMA leg and a UMTS leg in a media gateway according to an embodiment of the subject matter described herein. Referring to FIG. 6, a first media stream connection (labeled 1) is established between UMA node 112 or 114 and voice server 400A. A second media connection (labeled 2) is established between UMTS node 108 and voice server 400B. Once UMA-UMTS TrFO controller 428 (illustrated in FIG. 4) determines that transcoder-free operation is possible, UMA-UMTS TrFO controller 428 instructs voice server 402A to perform a loop back function and to initiate a connection (labeled 3) with voice server 402B. Implementing a loop back connection at voice server 402A means that the DSP on voice server 402A is not impacted. Thus, even though the solution illustrated in FIG. 6 requires two voice servers, DSP processing resources are conserved over conventional TrFO implementations in media gateway, because DSP resources on the voice server where the loop back is implemented are not used.

Rate Control Procedures

As described above, one aspect of establishing and maintaining a transcoding free connection for a call that includes a UMA and a UMTS leg is implementing rate control for both legs of a call. UMTS protocols include rate control messages to implement rate control procedures. UMA protocols do not have separate rate control messages and instead uses a codec mode request (CMR) field stored in media stream packets. While the above-referenced 3GPP standard indicates that media gateways should appropriately handle rate control requests from the Mb interface or the Nb interface, the standard is silent as to the timing and other implementation details of such procedures.

Figure 7:
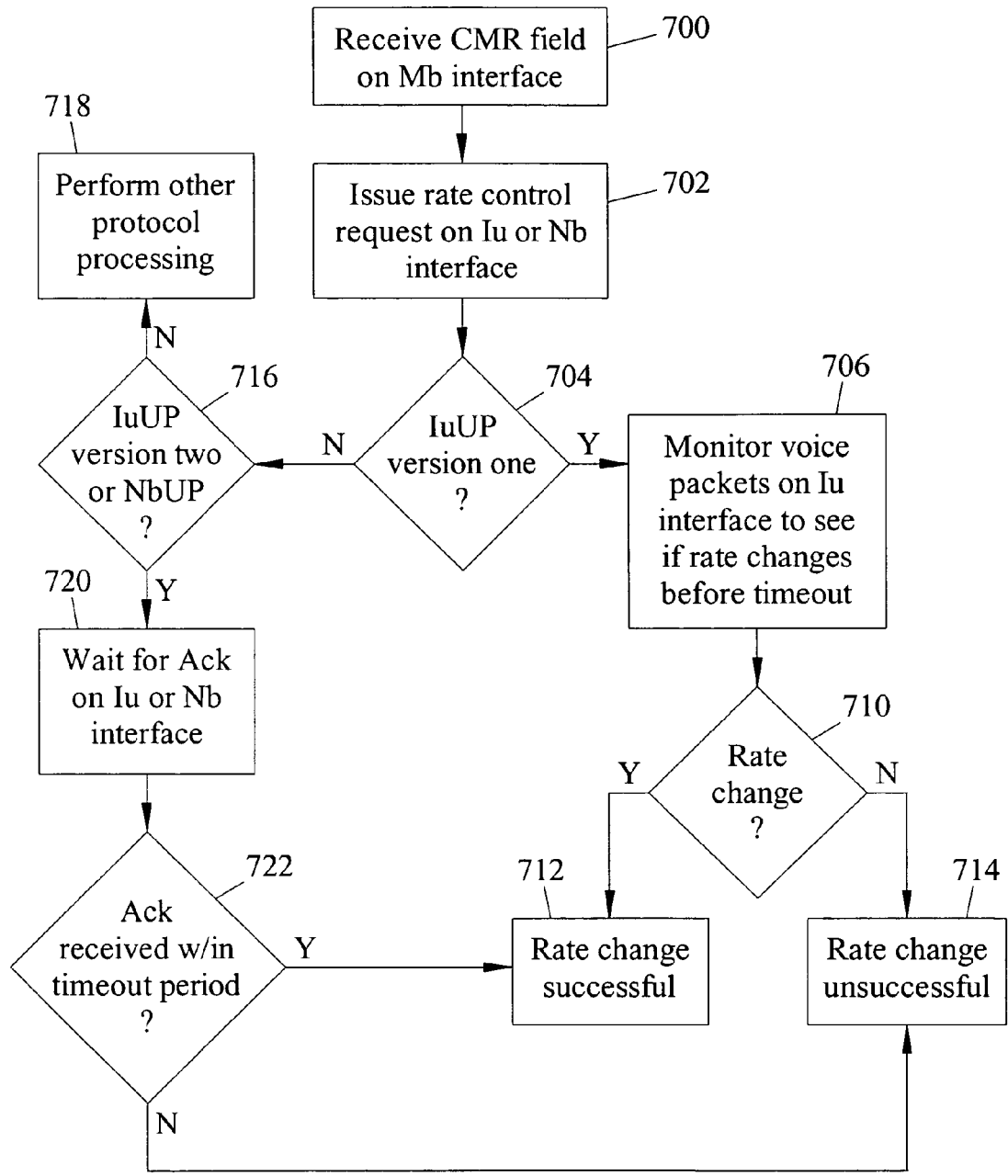
FIG. 7 is a flow chart illustrating exemplary steps that may be performed by a media gateway in response to a codec mode request received from a UMA endpoint of a call including a UMA leg and a UMTS leg according to an embodiment of the subject matter described herein.

FIG. 7 is a flow chart illustrating exemplary steps that may be performed by a media gateway 100 in processing a rate control request initiated by a UMA endpoint according to an embodiment of the subject matter described herein. Referring to FIG. 7, in step 700, media gateway 100 receives a media packet including a CMR field on the Mb interface. In step 702, media gateway issues a rate control request on the Iu or Nb interface, depending on how the UMTS node is connected to media gateway 100, requesting that the UMTS endpoint begin sending media packets encoded at the requested rate.

In step 704, processing diverges depending on whether the UMTS endpoint is using IuUP version 1 or version 2. If IuUP version 1 is being used, control proceeds to step 706 where media gateway 100 monitors voice packets on the Iu interface to see if the rate changes before a timeout period. In step 708, if media gateway 100 determines that the rate has changed, control proceeds to step 710 where media gateway 100 determines that the rate change was successful. In step 710, if media gateway 100 determines that the rate has not changed before the timeout period, control proceeds to step 714 where media gateway 100 determines that the rate change was not successful.

Returning to step 704, if IuUP version 1 is not being used, control proceeds to step 716 where media gateway 100 determines whether IuUP version 2 or NbUP is being used on the UMTS leg. If neither of these protocols is being used, control proceeds to step 718 where other protocol processing is performed. If, however, one of these protocols is being used, control proceeds to step 720 where media gateway 100 waits for an acknowledgement from the UMTS leg on the Iu or Nb interface. In step 722, media gateway 100 determines whether the acknowledgement was received within the timeout period. If the acknowledgment was received within the timeout period, control proceeds to step 712 where media gateway 100 determines that the rate change was successful. If, however, media gateway 100 does not receive the acknowledgement within the timeout period, media gateway 100 proceeds to step 714 where it determines that the rate change was unsuccessful.

Figure 8:
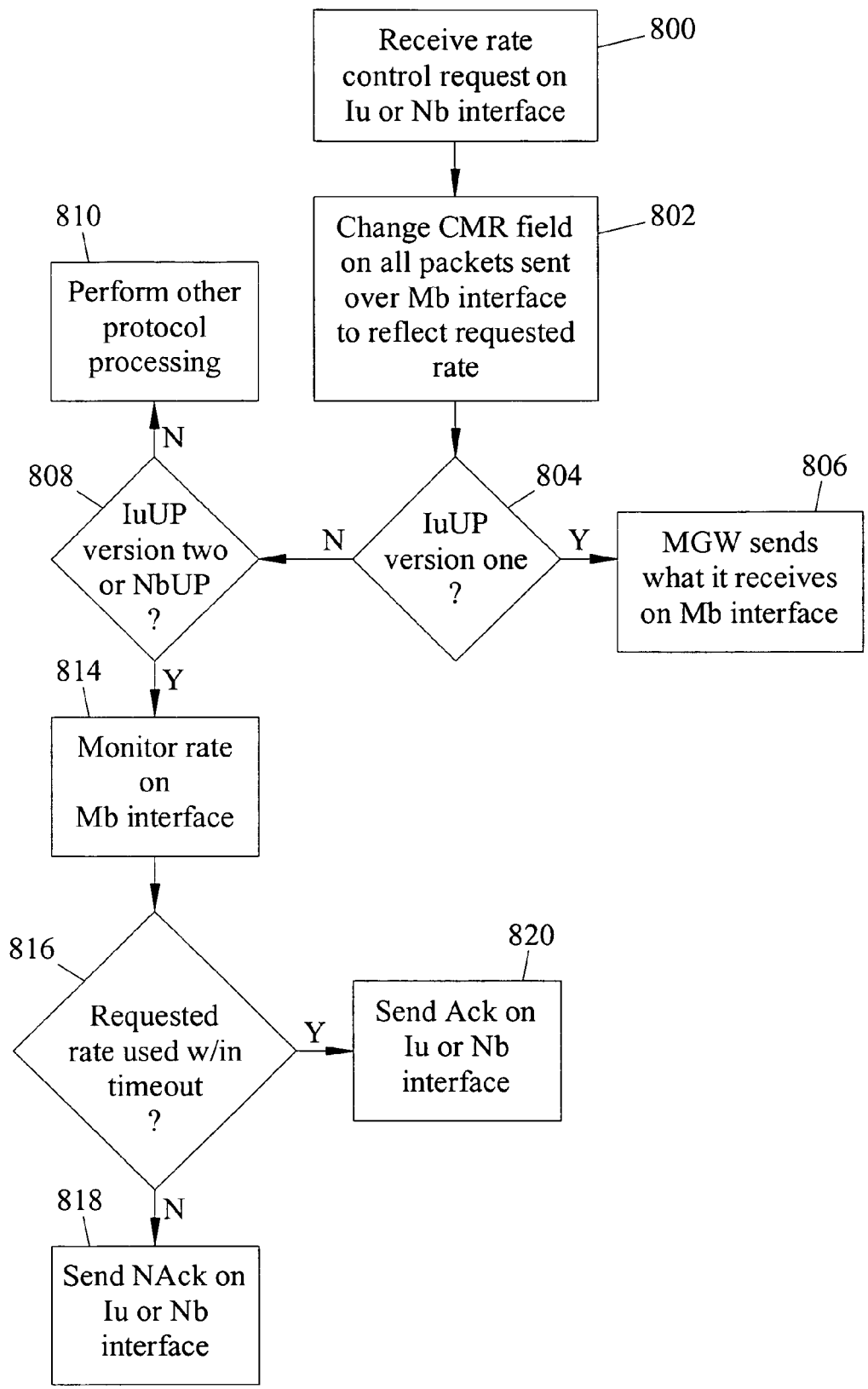
FIG. 8 is a flow chart illustrating exemplary steps that may be performed by a media gateway in response to a rate control request received from a UMTS leg of a call including a UMTS leg and a UMA leg according to an embodiment of the subject matter described herein.

FIG. 8 is a flow chart illustrating exemplary steps that may be performed by media gateway 100 in responding to a rate control request initiated by the UMTS leg of a call or session. Referring to FIG. 8, in step 800, media gateway 100 receives a rate control request on the Iu or Nb interface. In step 802, media gateway 100 changes the CMR field on all packets sent over the Mb interface to reflect the requested rate. In step 804, processing diverges depending on whether IuUP version 1 is being used. If IuUP version 1 is being used, control proceeds to step 806 where media gateway 100 sends packetized voice to the UMTS interface where the packetized is encoded at the rate at which media gateway 100 receives packetized voice on the Mb interface.

If IuUP version 1 is not being used, control proceeds to step 808 where media gateway 100 determines whether IuUP version 2 or NbUP is being used. If neither of these protocols is being used, control proceeds to step 810 where media gateway 100 performs other protocol processing. If however, one of these protocols is being used, control proceeds to step 812 where media gateway 100 monitors the encoding rate being used on the Mb interface. In step 816, media gateway 100 determines whether the requested rate is detected within the timeout period. If the requested rate is not detected within the timeout period, control proceeds to step 818 where media gateway 100 sends a negative acknowledgment on the Iu or Nb interface. If the requested rate is being used within the timeout period, control proceeds to step 820 where media gateway 100 sends positive acknowledgement on the Iu or Nb interface.

Redundancy Reconciliation

Another aspect of establishing and maintaining a transcoding free connection between a UMA and a UMTS call leg is redundancy reconciliation. A UMA connection uses packet redundancy to reconstruct voice packets in the event that a packet is lost. However, such redundancy is not used on a UMTS connection. Accordingly, media gateway 100 may reconcile this redundancy and send the appropriate packets over the UMTS and UMA legs of a connection.

Figure 9:
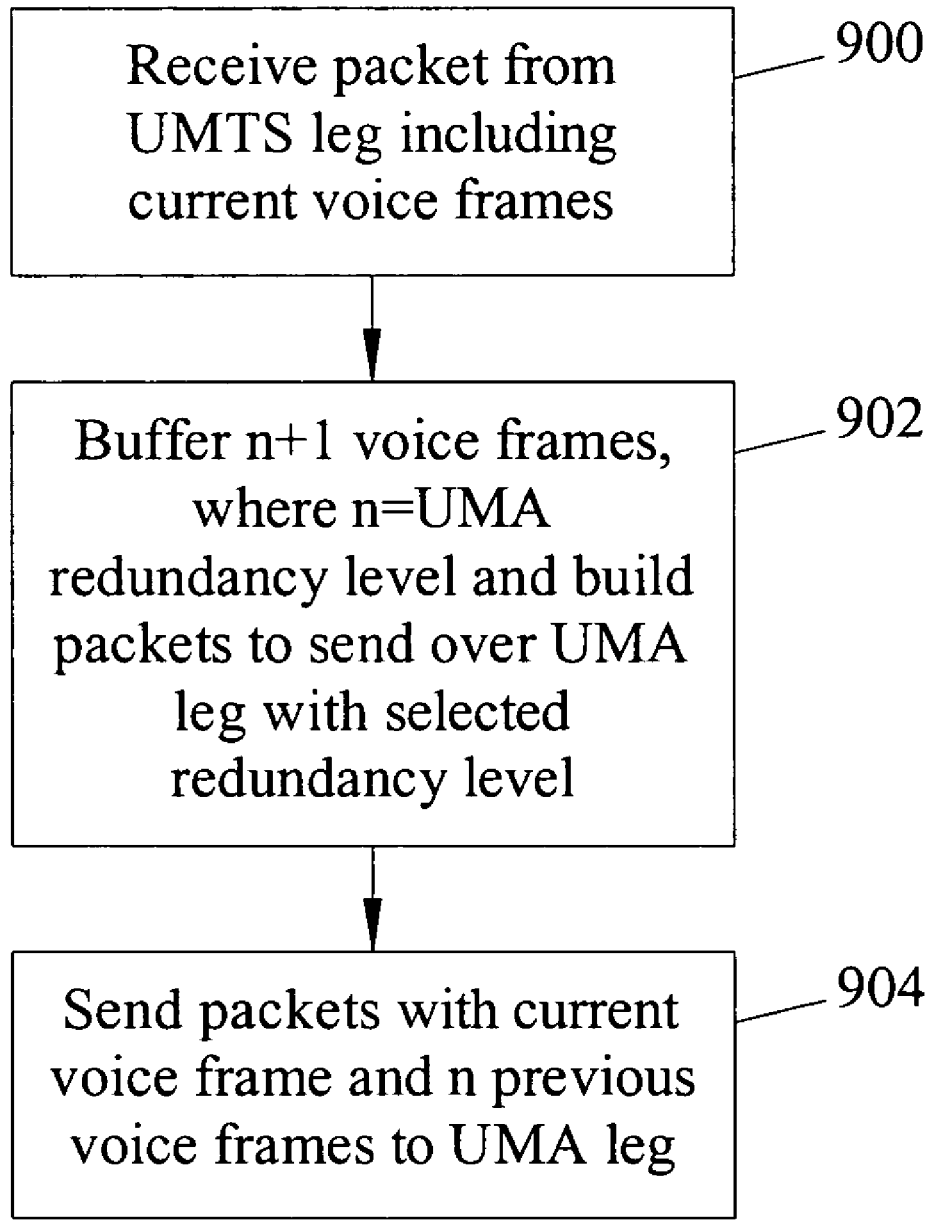
FIG. 9 is a flow chart illustrating exemplary steps for redundancy reconciliation that may be performed by a media gateway for building redundancy on a UMA call leg based on packets received from a UMTS call leg according to an embodiment of the subject matter described herein.

FIG. 9 is a flow chart illustrating exemplary steps performed by media gateway 100 in building redundant voice frames to be sent over a UMA leg based on voice frames received over a UMTS leg of a connection. Referring to FIG. 9, in step 900, media gateway 100 receives a packet from a UMTS call leg including a current voice frame. If the current voice frame is the first voice frame received for a connection, it is sent to the UMA leg without waiting to build redundancy in order to avoid delays. However, media gateway 100 may copy the current voice frame to sent with the next current voice frame as a redundant voice frame. Accordingly, in step 902, media gateway 100 buffers n+1 voice frames, where n is the UMA redundancy level and builds packets to send over the UMA call leg with the appropriate redundancy level. In step 904, media gateway 100 sends packets with the current voice frame and n previous voice frames to the UMA leg.

It should be noted that each current voice frame may be sent immediately to the UMA leg. Copies of each current voice frame may be made and maintained by media gateway 100 to build redundant frames to be sent along with each current voice frame.

Figure 10:
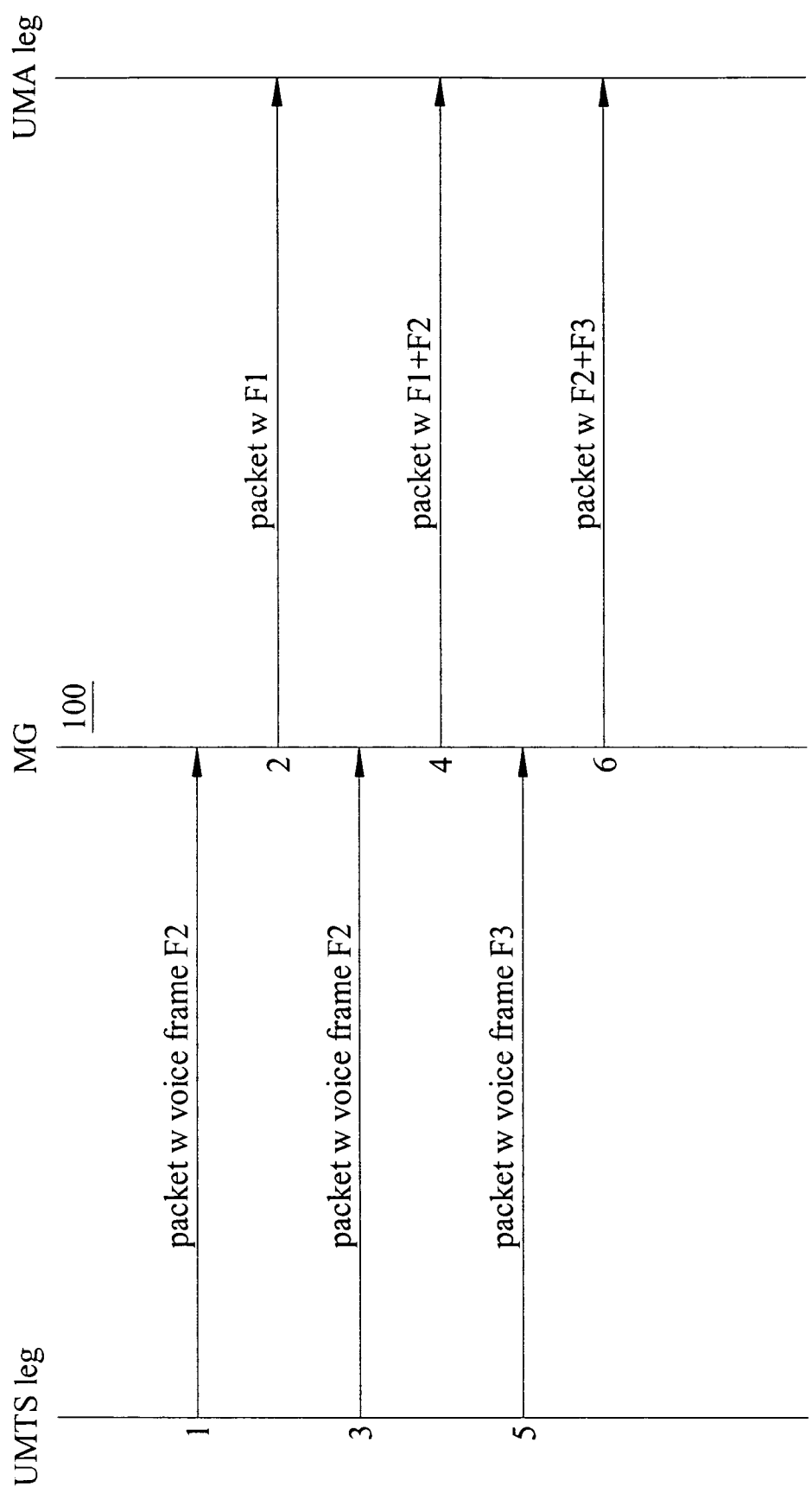
FIG. 10 is a flow diagram illustrating redundancy reconciliation for packets transmitted from a UMTS call leg to a UMA call leg according to an embodiment of the subject matter described herein.

FIG. 10 is a flow diagram illustrating exemplary steps for building UMA redundancy from UMTS data. Referring to FIG. 10, in line 1, media gateway 100 receives a packet with voice frame F1 from a UMTS leg of a call. In line 2, media gateway 100 immediately sends a packet with voice frame F1 over the UMA call leg. In line 3, media gateway 100 receives a packet with voice frame F2 from the UMTS call leg. In line 4, media gateway 100 sends a voice packet with frames F1 and F2 to the UMA call leg. In line 5 of the message flow diagram, media gateway 100 receives a packet with voice frame F3. In line 6 of the message flow diagram, media gateway 100 sends a voice packet with voice frames F2 and F3 to the UMA call leg.

Figure 11:
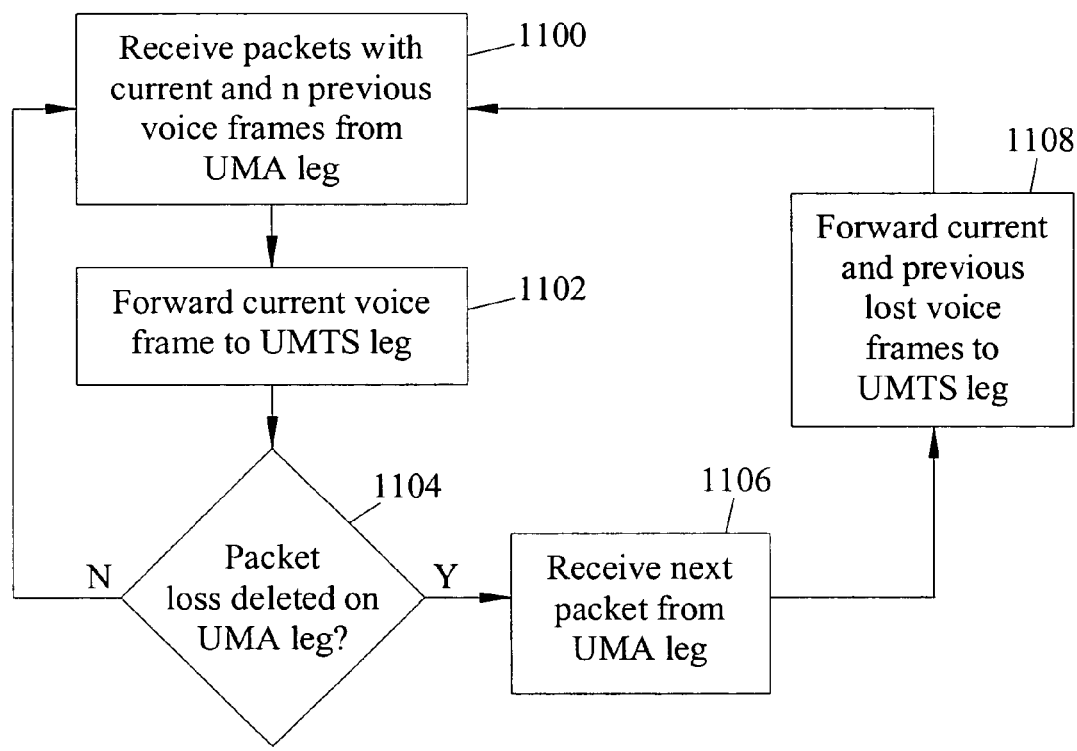
FIG. 11 is a flow chart illustrating exemplary steps for using redundant frames received on a UMA call leg to restore packets transmitted to a UMTS call leg according to an embodiment of the subject matter described herein.

FIG. 11 is a flow chart illustrating exemplary steps that may be performed by media gateway 100 in processing packets received from the UMA leg. Referring to FIG. 11, in step 1100, media gateway 100 receives packets with the current voice frame and n previous voice frames from the UMA call leg. In step 1102, media gateway forwards the current voice frame to the UMTS call leg. In step 1104, media gateway determines whether a packet loss was detected on the UMA call leg. If a packet loss has not been detected, control returns to step 1100 where the next UMA packet is received and processed.

In step 1100, if a packet loss is detected on the UMA leg, control proceeds to step 1106 where media gateway 100 receives the next packet from the UMA call leg. In step 1108, media gateway 100 forwards the current voice frame and previous lost voice frames to the UMTS call leg.

Figure 12:
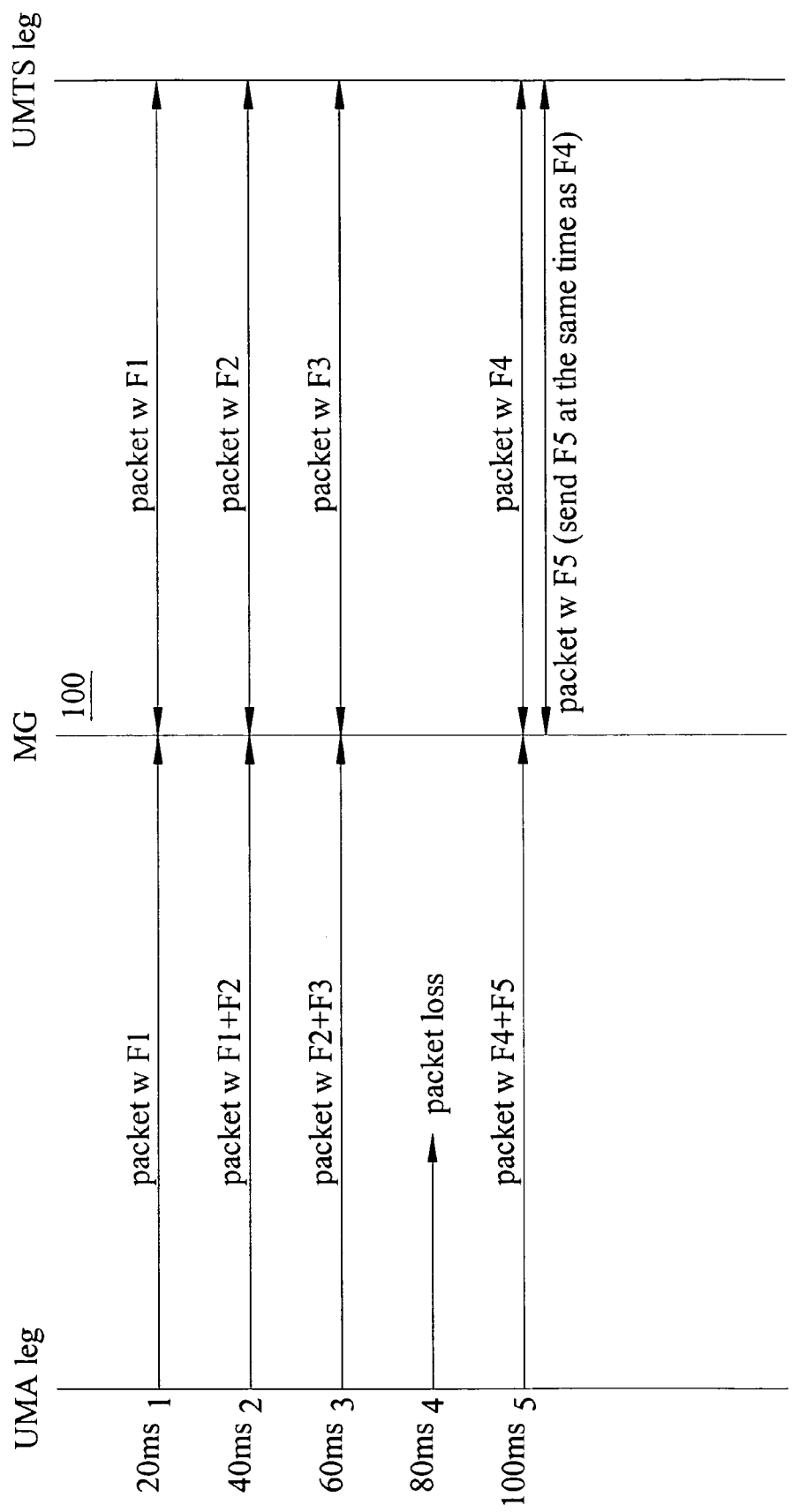
FIG. 12 is a flow diagram illustrating the use of UMA redundancy to transmit a lost frame to a UMTS call leg where the two call legs have the same packetization time according to an embodiment of the subject matter described herein.

FIG. 12 is a message flow diagram corresponding to the flow chart of FIG. 11. In FIG. 12, it is assumed that the packetization times of the UMA and UMTS call legs are the same. In lines 1-3 of the message flow diagram, media gateway 100 receives packets from the UMA leg and forwards the current voice frame to the UMTS leg. In line 4, a packet loss occurs on the UMA call leg. In line 5, the packet with the current voice frame and the lost frame are received from the UMA leg. Media gateway 100 sends the current packet and the lost packet at about the same time.

Figure 13:
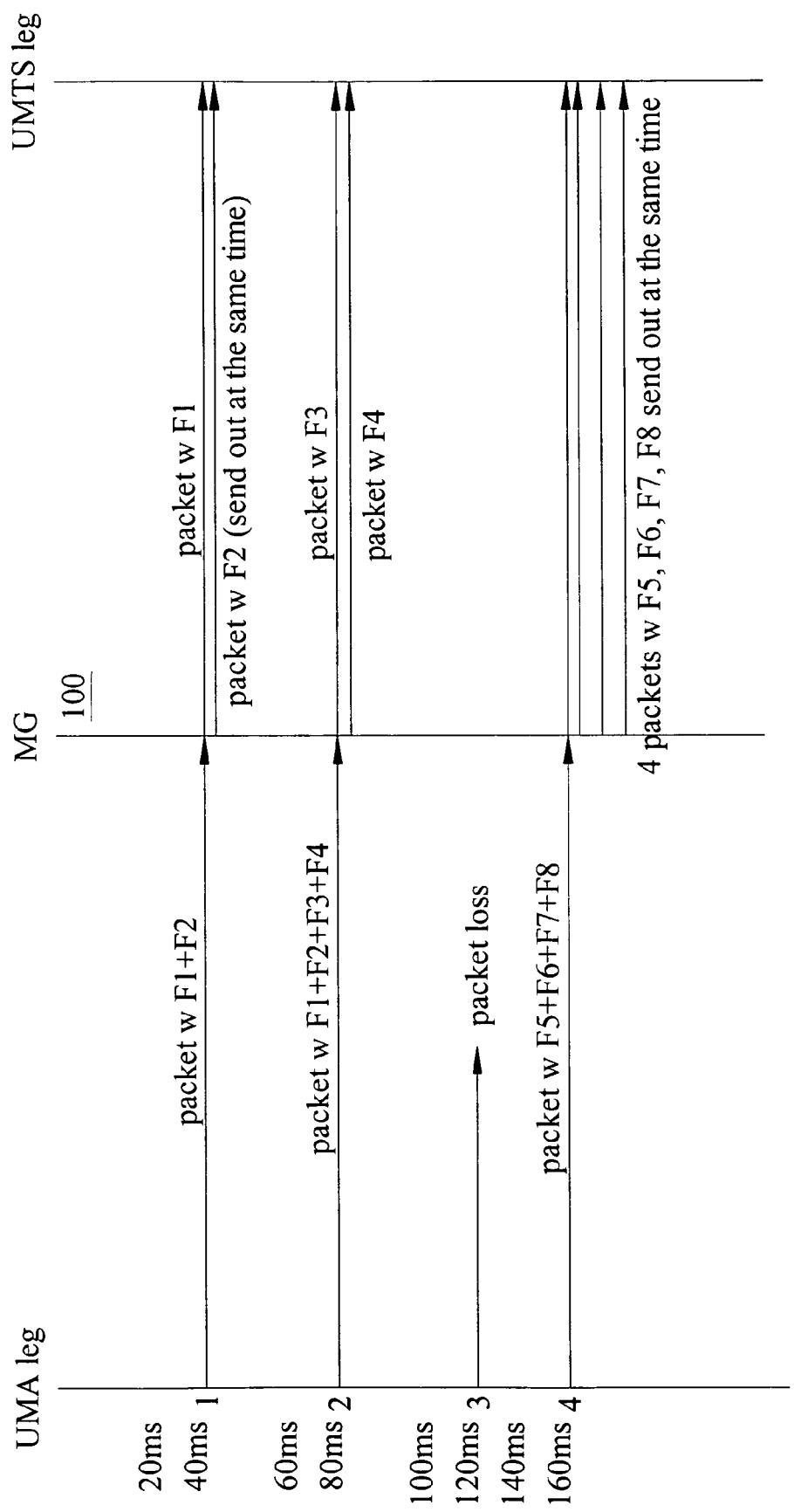
FIG. 13 is a flow diagram illustrating exemplary steps for using UMA redundancy to transmit lost frames to a UMTS call leg when the two legs have different packetization times according to an embodiment of the subject matter described herein.

FIG. 13 is a flow diagram illustrating redundancy reconciliation that may be performed by media gateway 100 where the UMA and UMTS legs use different packetization times. In FIG. 13, the UMA leg uses a 40 millisecond packetization time and the UMTS leg uses a 20 millisecond packetization time. Referring to FIG. 13, in line 1, the UMA call leg sends a packet with voice frames F1 and F2 to media gateway 100. Media gateway 100 immediately sends both packets F1 and F2 to the UMTS leg in light of the different packetization time. In line 2 of the message flow diagram, at 80 milliseconds, the UMA call leg sends a packet with voice frames F1, F2, F3, and F4, where frames F3 and F4 are current. Media gateway 100 sends only the current frames F3 and F4 to the UMTS leg. In line 3 of the message flow diagram, a packet is lost. In line 3 of the message flow diagram, media gateway 100 receives a packet from the UMA leg with voice frames F5-F8. Since none of these frames have been sent to the UMTS leg, media gateway 100 sends four packets with voice frames F5-F8 to the UMTS call leg.

It will be understood that various details of the subject matter described herein may be changed without departing from the scope of the subject matter herein. Furthermore, the foregoing description is for the purpose of illustration only, and not for the purpose of limitation.

What is claimed is:

1. A media gateway for establishing a transcoding free connection between unlicensed mobile access (UMA) and universal mobile telecommunications service (UMTS) legs of a connection, the media gateway comprising:
    (a) at least one broadband interface for sending media packets to and from a UMA leg and a UMTS leg of a connection;
    (b) a packet switching fabric for forwarding media packets between the at least one broadband interface and at least one internal processing resource of the media gateway;
    (c) at least one voice server for performing voice processing functions for media packets received from the UMA leg and the UMTS leg; and
    (d) a UMA-UMTS transcoder free operation controller for establishing a transcoding free connection within the media gateway between the UMA and the UMTS legs via the at least one broadband interface, the packet switching fabric, and the at least one voice server.

2. The media gateway of claim 1 wherein the at least voice server is adapted to issue a rate control request to at least one of the UMA leg and the UMTS leg to establish the transcoding free connection.

3. The media gateway of claim 2 wherein the at least one voice server is adapted to issue a UMTS rate control request to the UMTS leg.

4. The media gateway of claim 3 wherein the at least one voice server is adapted to monitor the encoding rate being used by the UMTS leg.

5. The media gateway of claim 3 wherein the at least one voice server is adapted to monitor the UMTS leg for an acknowledgement to the rate control request.

6. The media gateway of claim 3 wherein the at least one voice server is adapted to issue a codec mode request (CMR) to the UMA leg.

7. The media gateway of claim 6 wherein the at least one voice server is adapted to monitor the encoding rate being used by the UMA leg.

8. The media gateway of claim 7 wherein the at least one voice server is adapted to send an acknowledgement to the UMTS leg in response to determining that the codec mode request on the UMA leg is successful.

9. The media gateway of claim 7 wherein the at least one voice server is adapted to send a negative acknowledgement to the UMTS leg in response to failing to detect a change in the encoding rate on the UMA leg.

10. The media gateway of claim 1 wherein the at least one voice server is adapted to maintain the transcoding free connection.

11. The media gateway of claim 10 wherein, in maintaining the transcoding free connection, the at least one voice server is adapted to perform redundancy reconciliation between the UMA and UMTS legs.

12. The media gateway of claim 11 wherein, in performing the redundancy reconciliation, the at least one voice server is adapted to build redundant voice frames to be transmitted over the UMA leg based on packets received over the UMTS leg.

13. The media gateway of claim 11 wherein, in performing the redundancy reconciliation, the at least one voice server is adapted to receive redundant voice frames from the UMA leg and transmit current voice frames over the UMTS leg.

\* \* \* \* \*